US008090396B2

(12) United States Patent
Brown et al.

(10) Patent No.: US 8,090,396 B2

(45) Date of Patent: Jan. 3, 2012

(54) PUSH-TO-TALK FEATURES IN WIRELESS COMMUNICATIONS DEVICES AND METHODS

(75) Inventors: Marshall L. Brown, Chicago, IL (US); David S. Brenner, Mundelein, IL (US); Thaveesak Kraisornsuthasinee, Chicago, IL (US); Jennifer M. Lee, Chicago, IL (US); Ling Li, Vernon Hills, IL (US); Archana Vohra, San Diego, CA (US); William L. Zuckerman, Skokie, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 2115 days.

(21) Appl. No.: 10/610,285

(22) Filed: Jun. 30, 2003

(65) Prior Publication Data

US 2004/0266468 A1 Dec. 30, 2004

(51) Int. Cl.
*H04B 7/00* (2006.01)

(52) U.S. Cl. .................... 455/518; 455/90.2; 455/414.1; 455/450; 370/296

(58) Field of Classification Search .................. 455/518, 455/90.2, 414.1, 450, 78, 457, 458, 517, 455/519, 520, 575.3, 426.1; 370/296, 312, 370/341

See application file for complete search history.

(56) References Cited

U.S. PATENT DOCUMENTS

| | | | | |
|---|---|---|---|---|
| 6,215,474 | B1 * | 4/2001 | Shah | 345/168 |
| 6,775,560 | B2 * | 8/2004 | King et al. | 455/566 |
| 6,928,294 | B2 * | 8/2005 | Maggenti et al. | 455/518 |
| 6,941,160 | B2 * | 9/2005 | Otsuka et al. | 455/566 |
| 6,970,727 | B1 * | 11/2005 | Klein | 455/575.2 |
| 7,016,704 | B2 * | 3/2006 | Pallakoff | 455/566 |
| 7,020,098 | B2 * | 3/2006 | Ehrsam et al. | 370/260 |
| 7,047,030 | B2 * | 5/2006 | Forsyth | 455/518 |
| 2002/0094831 | A1 * | 7/2002 | Maggenti et al. | 455/518 |
| 2002/0102999 | A1 * | 8/2002 | Maggenti et al. | 455/518 |
| 2002/0137551 | A1 * | 9/2002 | Toba | 455/566 |
| 2002/0158812 | A1 * | 10/2002 | Pallakoff | 345/5 |
| 2003/0083107 | A1 * | 5/2003 | Morishima | 455/566 |
| 2003/0119562 | A1 * | 6/2003 | Kokubo | 455/566 |
| 2004/0058698 | A1 * | 3/2004 | Crockett et al. | 455/518 |
| 2004/0240407 | A1 * | 12/2004 | Ehrsam et al. | 370/328 |

OTHER PUBLICATIONS

Nextel iDEN Digital Multi-Service Data-Capable Phone i95cl Phone User's Guide, Jul. 9, 2002, 204 pages.

* cited by examiner

*Primary Examiner* — Shaima Q Aminzay

(74) *Attorney, Agent, or Firm* — Roland K. Bowler, II

(57) ABSTRACT

A wireless communications terminal that communicates in a communications infrastructure and methods therefor including opening a push-to-talk (PTT) contact list application (220) on the terminal when the terminal is in a dormant state, for example, by depressing a PTT input, and transitioning the terminal from the dormant state to an active state when the PTT contact list application is opened. Other PTT features include among others indicating on the terminal whether PTT contacts in the contact list are available for a PTT session, and indicating which PTT participant is talking.

7 Claims, 5 Drawing Sheets

500 522 520 PTT FEATURES DISPLAYED 512 516 PTT 510 514

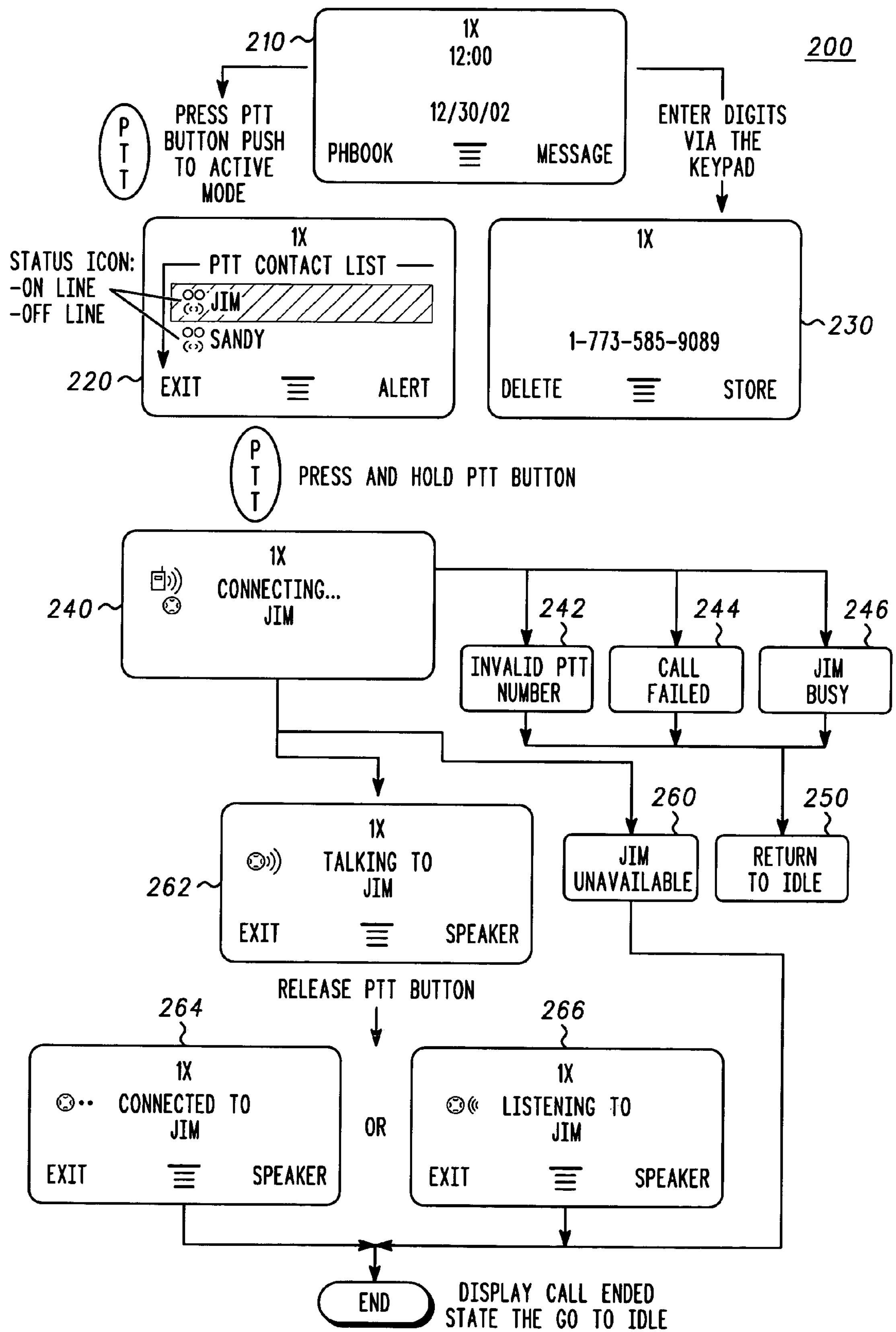

FIG. 2
200
210
1X
12:00
12/30/02
PHBOOK
MESSAGE
PTT
PRESS PTT BUTTON PUSH TO ACTIVE MODE
ENTER DIGITS VIA THE KEYPAD
STATUS ICON:
-ON LINE
-OFF LINE
1X
PTT CONTACT LIST
JIM
SANDY
220
EXIT
ALERT
1X
1-773-585-9089
230
DELETE
STORE
PTT
PRESS AND HOLD PTT BUTTON
240
1X
CONNECTING...
JIM
242
INVALID PTT NUMBER
244
CALL FAILED
246
JIM BUSY
260
JIM UNAVAILABLE
250
RETURN TO IDLE
262
1X
TALKING TO
JIM
EXIT
SPEAKER
RELEASE PTT BUTTON
264
1X
CONNECTED TO
JIM
EXIT
SPEAKER
OR
266
1X
LISTENING TO
JIM
EXIT
SPEAKER
END
DISPLAY CALL ENDED STATE THE GO TO IDLE

300
PHONE BOOK
1X
PTT CONTACT LIST
JIM
JONE
BACK
VIEW
310
PHONE BOOK
DETAIL VIEW
1X
JIM
18475238888
SPEED NO. 1
BACK
VIEW
312
314
P
T
T
PRESS AND HOLD PTT BUTTON
PUSH TO ACTIVE MODE
1X
CONNECTING...
JIM
320
IF NUMBER IS CONNECTED TO, CONNECTED SOUND IS PLAYED
1X
TALKING TO
JIM
EXIT
SPEAKER
330
RELEASE PTT BUTTON
1X
CONNECTED TO
JIM
EXIT
SPEAKER
332
OR
1X
LISTENING TO
JIM
EXIT
SPEAKER
334

PUSH-TO-TALK FEATURES IN WIRELESS COMMUNICATIONS DEVICES AND METHODS

FIELD OF THE DISCLOSURE

The present disclosure relates generally to wireless communications, and more particularly to push-to-talk functionality and features in communications devices, for example, in wireless communications handsets that communicate in cellular communications networks, communications devices including push-to-talk functionality and/or features and methods.

BACKGROUND OF THE DISCLOSURE

Push-to-talk (PTT) communications over a cellular communications (POC) network are known generally. In POC communications, cellular subscriber terminals communicate with other cellular subscriber terminals on the same cellular communications network using a walkie-talkie like capability of the terminals over the network infrastructure. During PTT sessions, only one subscriber terminal is able to talk at any particular time, referred to as half-duplex mode communications. To talk when the terminal is in PTT operating mode, the terminal user must depress a PTT button while talking. Upon releasing the PTT button, another party to the PTT session may talk upon depressing the push-to-talk button on their terminal. Cellular subscriber terminals are also capable of communicating in full duplex mode (where two parties may converse simultaneously) with other terminals in the same or different networks.

The various aspects, features and advantages of the disclosure will become more fully apparent to those having ordinary skill in the art upon careful consideration of the following Detailed Description thereof with the accompanying drawings described below.

BRIEF DESCRIPTION OF THE DRAWINGS

FIG. 2 is an exemplary PTT process flow diagram.

DETAILED DESCRIPTION

Figure 1:
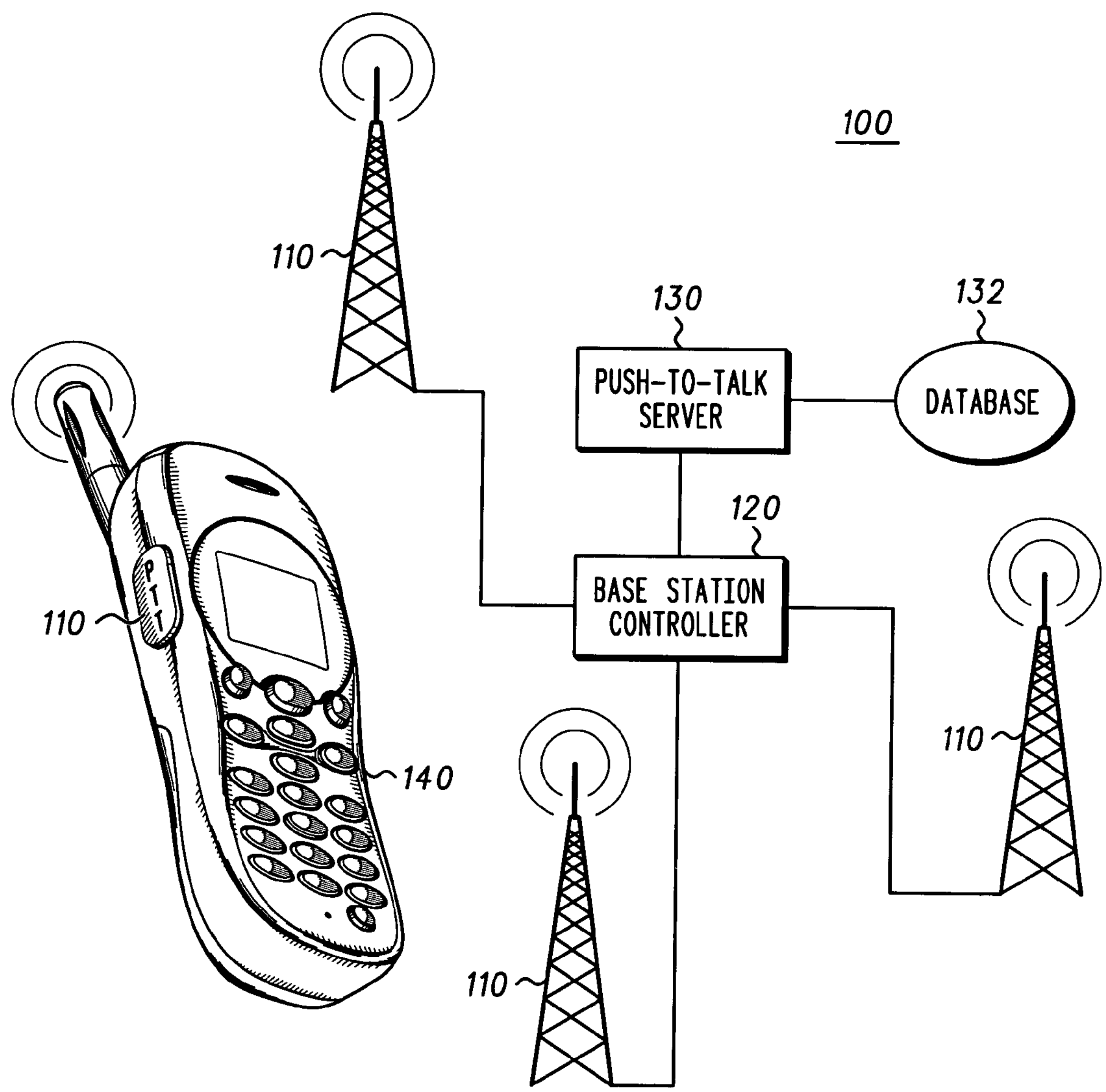
FIG. 1 is an exemplary wireless communications device that supports (PTT) communications.

FIG. 1 illustrates a wireless communications network that supports push-to-talk (PTT) communications. The network comprises a plurality of base station transceivers 110 coupled to a base station controller 120 and other network infrastructure known generally but not illustrated. The wireless communications network may be, for example, a 2$^{nd}$ Generation (2G) Global System for Mobile Communications (GSM) network, or a 3$^{rd}$ Generation (3G) Universal Mobile Telephone System (UMTS) network, or a combination of 2G and 3G networks, or some other communications network, any one of which may also include or support packet data services, for example, General Packet Radio Service (GPRS).

In FIG. 1, the base station controller is coupled to a PTT server 130, which has access to a PTT subscriber database 132. FIG. 1 also illustrates a PTT capable wireless communications device or terminal 140 capable of communicating with other PTT capable terminals in a PTT mode of operation, which is typically half-duplex communication. The exemplary terminal 140 includes a PTT input key 142 for this purpose as discussed more fully below. The communications device 140 is also capable generally of communicating with other terminals in a full duplex mode of operation, more typically associated with cellular communications systems. The terminal 140 is typically a mobile cellular subscriber handset, although in other embodiments it may be a wireless enabled personal digital assistant (PDA) or laptop computer or some other device, which may be a mobile or fixed communications station.

In the process diagram 200 of FIG. 2, at block 210, the terminal, for example, the terminal 140 of FIG. 1, is in an idle mode of operation. In one embodiment, the terminal transitions from the dormant state to an active state when the push-to-talk contact list application is opened. A pre-condition for establishing PTT calls, is the establishment of an active packet data state or session for the terminal. In FIG. 2, upon opening the push-to-talk (PTT) menu at block 220, the terminal transitions to the active state. According to this aspect of the disclosure, the subscriber terminal transitions from the dormant state to the active state before initiating a push-to-talk session. A push-to-talk session may be initiating by the user upon selecting a contact on the contact list after transitioning the wireless communications device to the active state.

Transitioning to the active state upon opening the PTT menu reduces delay that would otherwise be experienced by the user if the terminal did not transition to the active state until after the user selected a PTT contact from the PTT menu. In most instances, the user will initiate a PTT call or session with a contact on the PTT contact list upon opening the PTT contact list. Thus upon opening the PTT contact list, the user may select and communicate with a push-to-talk contact on the PTT contact list. In other embodiments and modes of operation, the terminal does not transition to the active state before selecting a PTT contact. For example, the user may direct dial the PTT contact number.

In one embodiment, the PTT menu is opened, for example, during operation of the terminal in the idle state, upon depressing a PTT button on the terminal. Preferably, only one depression of the PTT button, or some other hard or soft input, is required to open the PTT menu. In other embodiments however the PTT button may be depressed more than once or one or more other keys may be depressed alone or in combination with the PTT button to open the PTT contact list.

In one embodiment, the terminal obtains PTT information from the network upon, for example, shortly after entering the active state. In FIG. 1, for example, the PTT server 130 obtains PTT contact data from database 132. According to this embodiment, the terminal 140 receives the PTT contact data from PTT server 130 upon entering the active state whereupon the terminal populates contact fields of the PTT contact list application with the PTT contact data.

In some embodiments, the terminal is also capable of initiating circuit-switched calls, for example, to other subscriber terminals in the same network or in another cellular network, etc. In FIG. 2, at block 230, for example, the user may dial an 11-digit communications number to communicate with other terminals in a full duplex mode of operation more commonly associated with mobile wireless communications devices. In one embodiment, the PTT contact list application is separate from the telephone list application on the terminal.

In another embodiment, PTT contacts have the same PTT contact number as their telephone number. For example, the PTT contact list application and the telephone list application includes at least one common contact, wherein the one or more contacts common to both applications have the same PTT and telephone number. According to this aspect of the disclosure, a different PTT contact number is not required for PTT contacts, since the PTT contact number is the same as the telephone number.

Figure 3:
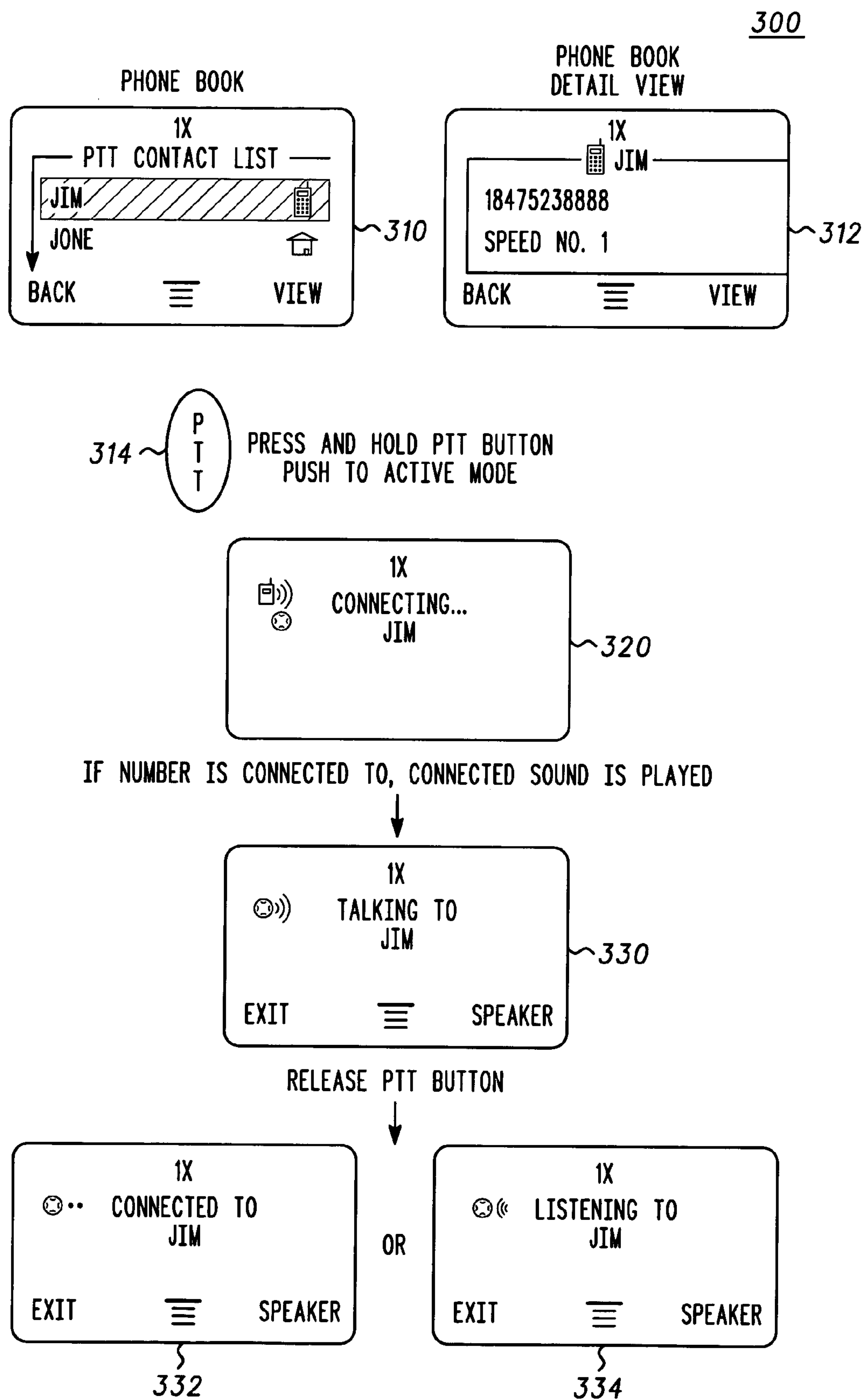
FIG. 3 is another exemplary PTT process flow diagram.

In the process diagram 300 of FIG. 3, at block 310, the user selects a PTT contact from the phone book, other than the PTT contact list. The details, for example, the phone number, speed dial number assignment, etc., of the selected contact are illustrated at block 312. A PTT call may be initiated with the selected contact by actuating the PTT input button 314, whereupon the terminal is first pushed or transitioned to the active mode before connecting to the selected contact at block 320. In some embodiments, a chime or other audio output is provided to indicate that a connection has been made to the PTT contact. The audio output may be provided to also indicate that the PTT contact has been connected in the process of FIG. 2, for example, after block 240 as discussed further below.

Figure 4:
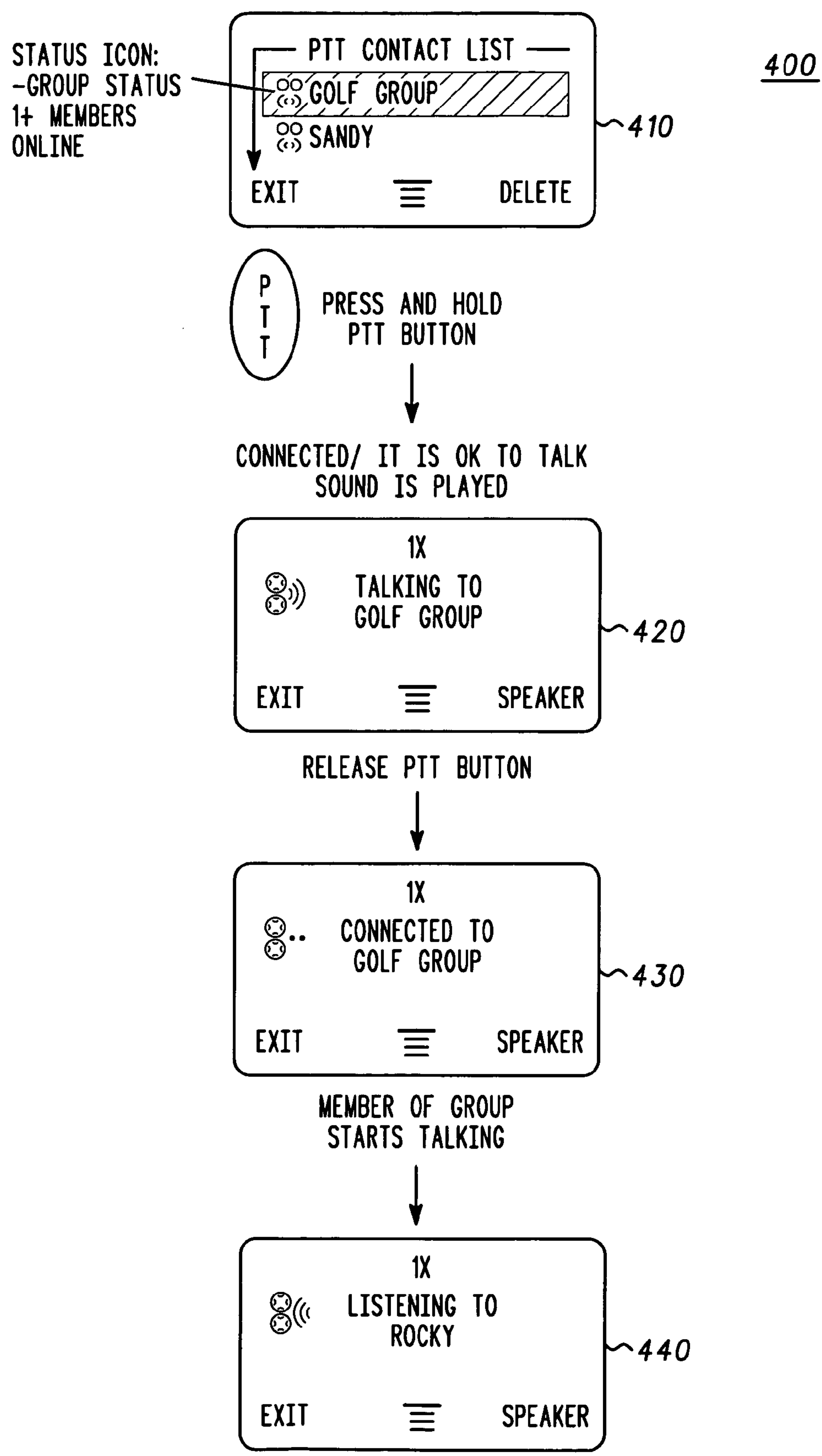
FIG. 4 is an exemplary PTT process flow diagram for an exemplary Group call.

In FIG. 2, at block 220, the user may select a PTT contact on the PTT contact list, for example, by scrolling the list. In one embodiment, the PTT contact list includes information about the availability of the contacts, for example, whether the contact is connected to the network, or whether the contact is on-line or off-line. In FIG. 2, for example, the PTT contact list includes a plurality of individual contacts, and each contact has associated therewith a status icon indicating whether the corresponding contact is available for a PTT session. Similar information may be provided for PTT contact groups. In one embodiment, for example, the PTT contact list application includes at least one group contact comprising a plurality of at least two individual contacts, and the application indicates whether the at least one PTT contact group is available for a PTT session. In FIG. 4, at block 410, the PTT contact list comprises a "Golf Group" with an indication of how many group members are on-line presently.

In FIG. 2, at block 240, upon selecting a PTT contact at block 220, for example, by scrolling to the contact, the terminal user may initiate a PTT call or session with the selected contact, for example, by depressing and holding the PTT input. In FIG. 2, the terminal provides a visual indication that the terminal initializing the PTT call is attempting to contact the selected PTT contact. In one embodiment, if a PTT session call fails, the terminal also indicates generally why the failure occurred. For example, at block 242, if the contact selected cannot receive a PTT communication, the terminal indicates that the PTT contact number is invalid. If the network PTT server is down or otherwise unavailable, the terminal indicates that the PTT call failed at block 244. At block 246, if the selected PTT contact is on another call, the terminal indicates that the selected contact is busy. Generally if the PTT call is unsuccessful for any one of the reasons in block 242, 244, 246 or for some other reason, the terminal will return to a prior state, for example, to the idle state at block 210 or to the PTT contact menu at block 220, as indicated at block 250. In one embodiment, the terminal does not return to the idle or other state until the expiration of a time-out period during which the terminal attempts to make the PTT call. In FIG. 2, at block 260, if the PTT call is successful but the PTT contact called ignores the PTT call or if the PTT contact called goes off-line after the PTT call is made, the terminal indicates that the contact is unavailable. Similar indications may be made in the process flow diagram of FIG. 3.

In another embodiment, the terminal indicates generally the status of each PTT participant during a PTT call or session. If the PTT call was completed successfully and the PTT contact called accepts the call, the terminal indicates whether the terminal originating the PTT call is talking or listening or connected, which occurs when the floor is open, i.e., no PTT call participant has depressed the PTT input. For example, in FIG. 2, at block 262, the terminal indicates that the user is talking to the PTT contact called when the PTT input is depressed. A similar indication is made in FIG. 3 at block 330. In FIG. 2, at bock 264, when the PTT button is released and no other party is depressing the PTT button, the terminal indicates with whom it is connected in the PTT call. At block 266, when another PTT participant is talking, i.e., when another terminal participating in the PTT call presses its PTT input, the terminal indicates that the user is listening to the other PTT terminal. FIG. 3 illustrates similar status indications at blocks 332 and 334 including for example which push-to-talk contact has control of the push-to-talk call, etc.

The PTT call participant status features discussed above are also applicable during PTT group calls. In FIG. 2, at block 240, for example, the terminal may indicate that it is connecting to particular PTT group, for example, by listing the group name and/or the individual group participants in the call. At block 262, the terminal may indicate that its user is talking to the PTT group when its PTT input is depressed. At block 264, the terminal may indicate that it is connected to the group when no group member has depressed the PTT input. At block 264, the terminal will indicate which group member is talking. In FIG. 4, at block 420, when the terminal PTT button is depressed, the exemplary PTT contact application indicates that the terminal user is talking to the "Golf Group". When the PTT button is released, the terminal indicates that it connected to the "Golf Group" at block 430. At block 440, the terminal identifies other group members talking.

Figure 5:
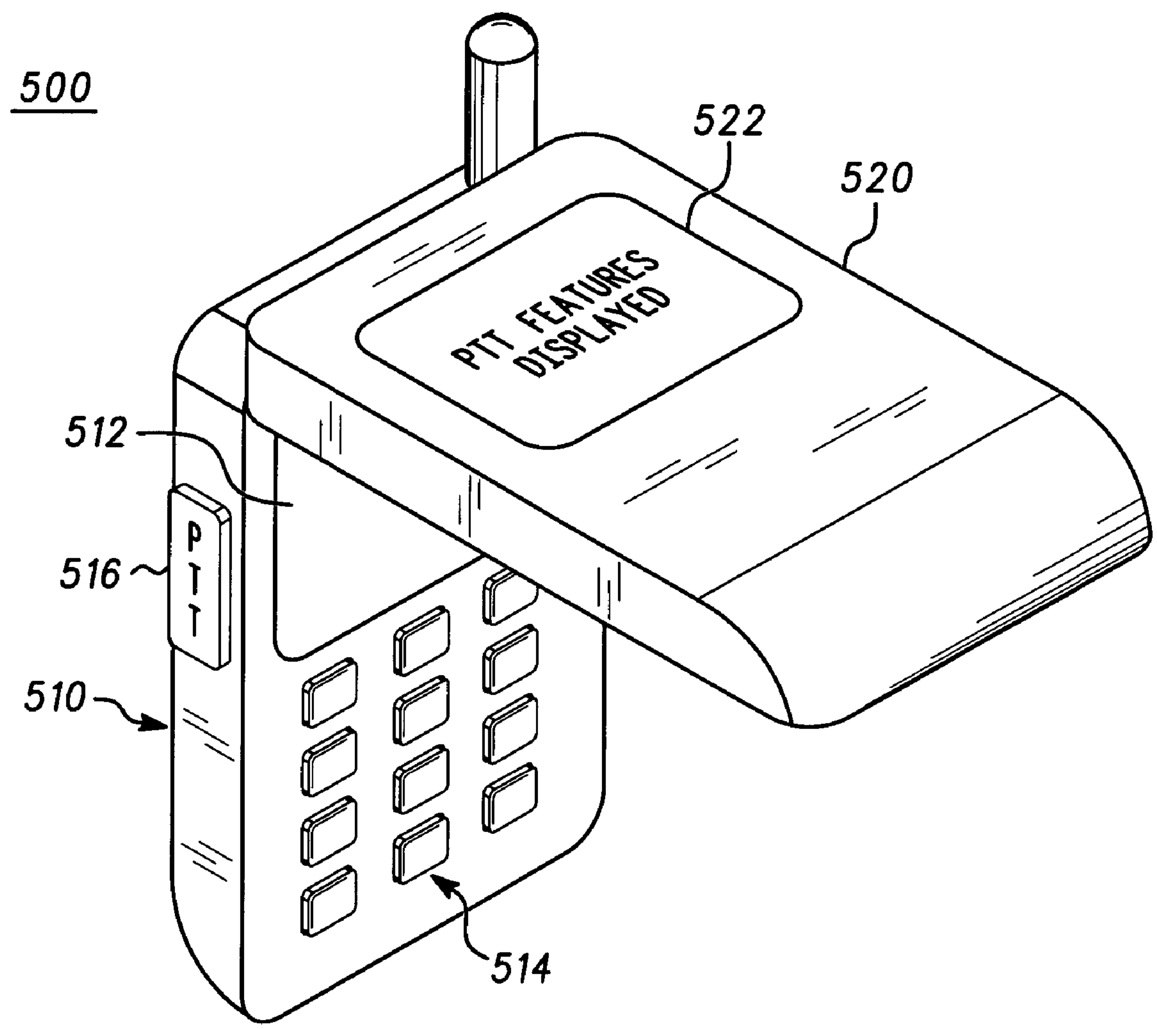
FIG. 5 is another exemplary PTT terminal.

FIG. 5 illustrates an exemplary clamshell type communications terminal 500 having PTT communications capability. The terminal includes a first portion 510 having an inner display 512, a keypad 514, and a PTT pushbutton 516. Hinged to the first terminal portion 510, is a second portion 520 having an outer display 522. When the clamshell is opened, so that the inner display 512 is exposed, the PTT contact list and PTT features discussed herein may be displayed on the inner display 512. When the clamshell is closed, so that the second portion 520 covers the first display portion 512, the PTT contact list and PTT features may be displayed on the outer display. The outer display may display, for example, whether the contacts in the PTT Contact list are available for a PTT session, or display PTT contact has control of the PTT call, among other information.

While the present disclosure and what are considered presently to be the best modes of the inventions have been described in a manner that establishes possession thereof by the inventors and that enables those of ordinary skill in the art to make and use the same, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A method in a wireless communications device that communicates in a communications infrastructure, the method comprising:

opening a push-to-talk client on the wireless communications device;

indicating on the wireless communications device which push-to-talk contact has control of a push-to-talk call upon opening the push-to-talk client.

2. The method of claim 1, indicating when the push-to-talk contact having control of the push-to-talk call releases control of the push-to-talk call.

3. The method of claim 1, indicating on the wireless communications device which push-to-talk contact has control of a push-to-talk group call.

4. The method of claim 1, indicating on the wireless communications device push-to-talk call participants.

5. The method of claim 1, the wireless communications device is a clam-shell device having an inner display and an outer display, indicating which push-to-talk contact has control of the push-to-talk call on the outer display of the wireless communications device.

6. A method in a wireless communications device that communicates in a communications infrastructure, the method comprising:

opening a push-to-talk contact list application on the wireless communications device, the push-to-talk contact list application including a plurality of at least two push-to-talk contacts;

positioning a cursor on a push-to-talk contact, of the push-to-talk contact list application, last invoked in a most recent push-to-talk session upon opening a push-to-talk contact list application.

7. The method of claim 6, the wireless communications device is a clam-shell device having an inner display and an outer display, displaying the push-to-talk contact last invoked in the most recent push-to-talk session on the outer display.

* * * * *